United States Patent [19]

Cote et al.

[11] Patent Number: 5,182,019
[45] Date of Patent: Jan. 26, 1993

[54] CARTRIDGE OF HYBRID FRAMELESS ARRAYS OF HOLLOW FIBER MEMBRANES AND MODULE CONTAINING AN ASSEMBLY OF CARTRIDGES

[75] Inventors: Pierre L. Cote, Hamilton; Roger P. Maurion, Burlington; Christopher J. Lipski, Burlington; Steven K. Pedersen, Burlington, all of Canada

[73] Assignee: Zenon Environmental Inc., Burlington, Canada

[21] Appl. No.: 845,168

[22] Filed: Mar. 3, 1992

Related U.S. Application Data

[63] Continuation-in-part of Ser. No. 569,405, Aug. 17, 1990, Pat. No. 5,104,535.

[51] Int. Cl.⁵ ............................................. B01D 63/04
[52] U.S. Cl. ........................... 210/321.8; 210/321.89; 210/500.23; 264/45.1
[58] Field of Search ............ 210/321.89, 321.6, 321.64, 210/321.72, 321.78, 321.79, 321.8, 321.87, 321.88, 500.23; 264/41, 45.1, DIG. 48, DIG. 62

[56] References Cited

U.S. PATENT DOCUMENTS 3,993,816  11/1976  Baudet et al. ......................... 428/45

Primary Examiner—Frank Sever
Attorney, Agent, or Firm—Alfred D. Lobo

[57] ABSTRACT

A module is disclosed for use as a membrane device, comprising, a shell with fluid couplings removably affixed to each of its ends containing at least one cartridge having an axial conduit. The cartridge is formed with plural frameless arrays of hollow fibers of selectively permeable material. Each array is free of any means to support the fibers intermediate split-clip headers in which the fibers are held near their opposite ends, except for tension cords which may be substituted for fibers. The split-clip headers are mirror-images of each other. Each has a peripheral potting channel and longitudinal, laterally spaced apart grooves in the split-clip headers. The upper and lower sections, placed one upon the other, together form through-passages ("grooves") in which terminal portions of the fibers are snugly embraced. The fibers lie in parallel spaced-apart relationship in a plane substantially orthogonal to the axial conduit, and their ends are cut before a stack of arrays is potted. The fibers of one array lie transversely relative to those of another array. The cartridge is disposed longitudinally within the shell and comprises plural split-clip headers which when laminated, one to another, define the central axial which need not be fluid-tight but only near-fluid-tight, so the terminal portions of the fibers can be potted.

31 Claims, 11 Drawing Sheets

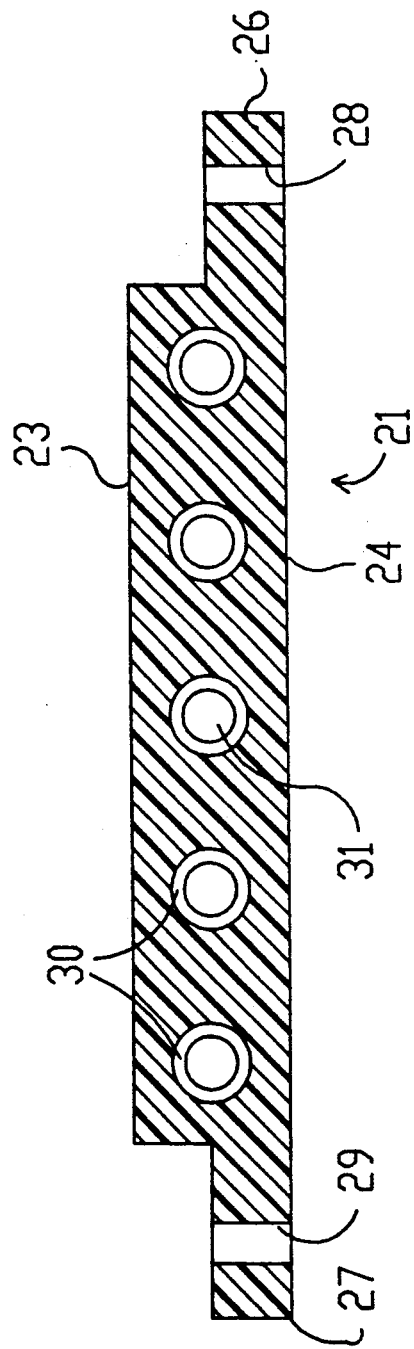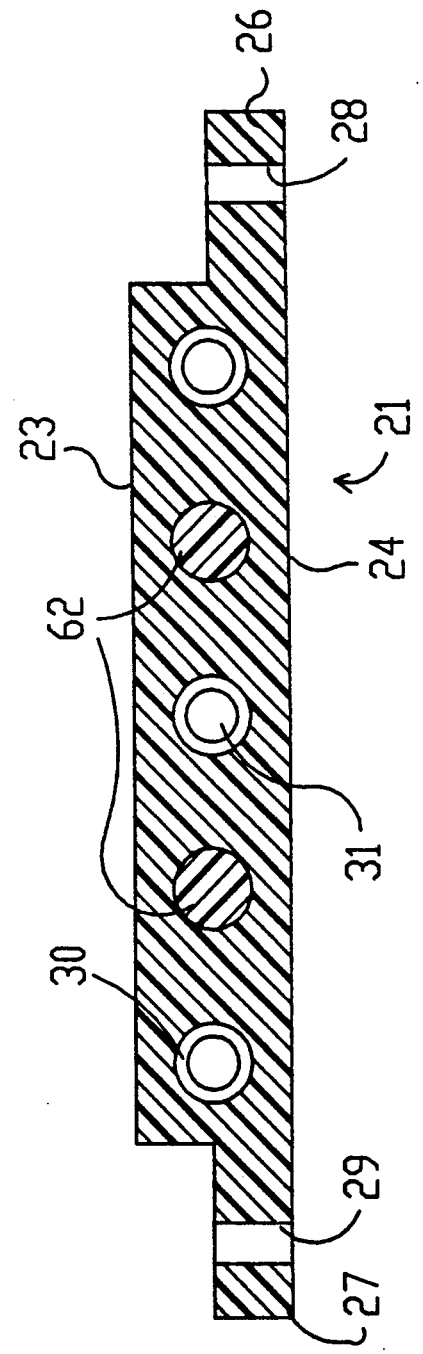

CARTRIDGE OF HYBRID FRAMELESS ARRAYS OF HOLLOW FIBER MEMBRANES AND MODULE CONTAINING AN ASSEMBLY OF CARTRIDGES

This invention is a continuation-in-part application of copending patent application Ser. No. 07/569,405 filed Aug. 17, 1990, now U.S. Pat. No. 5,104,535.

BACKGROUND OF THE INVENTION

Our parent application was directed to a frameless array of hollow fibers which was formed without potting the terminal portions of the fibers. The term "array" is used to refer to a layer of plural fibers in spaced-apart disposition in a single plane, which fibers are held near their terminal portions in a pair of opposed split-clip headers which will be described herebelow. Despite the effectiveness of a stack of interfitted frameless arrays which were adhesively bonded one to another to form a cartridge, we found that in high pressure applications, we were required to be excessively preoccupied with close tolerances if we were to provide a leak-proof stack of arrays. Hereafter an assembly of plural arrays which are not bonded together to form a unitary assembly, is referred to as a "stack"; if the assembly is bonded together to form a unitary assembly, it is referred to as a "cartridge". Though this invention is specifically described in relation to a cartridge of frameless arrays, it is more widely applicable in general concept to an assembly of cells used in prior art modules. The term "cell" is used to refer, in addition to an "array", in a more general sense, to refer to a prior art assembly of fibers within a frame.

To be competitive in the marketplace it was necessary to find a substitute for the too-demanding fabrication of a frameless array and a stack of such arrays. In this invention we have post-potted the terminal portions of fibers held in grooves, in situ, while the arrays are held in a stack, that is, after plural arrays have been coaxially aligned and interfitted, irrespective of whether the arrays are fluid-tightedly bonded together. We have in a single step, potted all fibers near their ends to form an annular shell of potting resin within a unitary cartridge, without having to sever the ends of the fibers after they are potted, as will be explained in greater detail herebelow. By "unitary" we mean that the framless arrays cannot be disassembled without damaging the cartridge.

Over the past several decades, the basic principles which govern the operation of membrane devices have become well known. How to use those principles to maximixe the efficiency of a membrane device such as a "module", is not; and the concept of reinforcing a nearly-fluid-tight disposition of fibers with an annular shell of potting resin, to ensure leak-proof flow of a feed-stream being treated under elevated pressure, has, to date, escaped the art.

In the particular instance when the membrane is in the form of a capillary tube or hollow fiber and used for filtration, the membrane material divides the module into a "feed zone" and a non-feed zone referred to as a "permeate zone" irrespective of whether the module is used in a filtration application. The feed which is introduced either externally (referred to as "outside-in" flow) or internally ("inside-out" flow) of the fibers, is resolved into "permeate" and "concentrate" streams. Many physical considerations affect the operation of a module. For example, the permeability and rejection properties of the membrane; the process flow conditions such as pressure, rate of flow, temperature, etc.; the physical and chemical properties of the feed and its components; the relative directions of flow of feed and permeate; the thoroughness of contact of the feed with the walls of the fibers; and other parameters, each has a direct effect on the efficiency of the module. The goal is to maximize the efficiency of the module and to do so in a practical and economic manner. The term "fiber" is used herein to refer to both organic polymeric membranes and to ceramic/metallic (ceramic, or metallic, or both) membranes, except when the latter is specifically referred to. Under such a circumstance, because ceramic/metallic membranes are typically much larger in diameter than organic polymeric fibers, the ceramic/metallic membranes are referred to as "hollow membranes".

Readily apparent is that channelling of the feed due to uneven distribution of the fibers will result in substantially poorer performance of the module than if the feed flowed evenly over the surface of each fiber in the bundles of fibers. Since the rate of transfer of the desired component of the feed from one side of the membrane to the other is necessarily relatively slow, to obtain an optimum rate of transfer requires maximizing the surface area of the membrane and maintaining an effective driving force such as a concentration or pressure differential between opposed surfaces of the fibrous membrane. As a result it becomes essential to use a multiplicity of long fibers of small diameter within the casing (shell) of a module so as to minimize the void (unoccupied space) therewithin without packing the fibers together too tightly, and to use as high a fluid velocity or pressure differential as the physical and economic circumstances will permit. But long fibers are susceptible to damage, the longer the fiber, the greater the susceptibility.

If the fibers are packed too tightly in "outside-in" flow, the throughput of feed cannot be increased in proportion to the number of fibers used because of the increased pressure drop. If the length of fibers is increased too much the resistance of the flow path within the bores of the fibers becomes a limiting factor which limits the throughput of feed, though the pressure drop through the bundle of fibers in the module may not be a factor.

In the particular instance of filtration, using such "outside-in" flow of feed, not only does the feed flow through the path of least resistance, namely the largest voids, but it will also tend to collect in some voids from which flow is impeded. The result is that the concentration of a residual component ("residue") remaining on the outside of the fibers ("concentration polarization"), increases. Some of the residue will pass through the walls of the fibers and increase the concentration of the residue impurity in the permeate. If the residue is a salt, some, when concentrated will precipitate on the fibers, surfaces reducing their effective area available for permeation, a phenomenon known as "fouling".

To counter the problems of poor flow of feed through a module and the resulting inefficient mass transfer of the permeate across the membrane, numerous schemes have been suggested, some more practical than others. All are characterized by a conspicuous absence of details as to packing efficiency of the fibers in the module, and most particularly, how one might "fix" the orientation of the large number of fibers required in a practical module.

Routinely, hollow fibers are "potted" near one, or near opposed ends, in a hardened synthetic resinous "header" which is adapted to be inserted with suitable gasketing means, in fluid-tight engagement with the interior wall of the casing of the module. The end surface of each header appears foraminous because of the planarly disposed exposed ends of the hollow fibers, the solid resin forming a seal around the exterior terminal portions of each fiber.

In addition to coping with the problem of positioning a large number of fibers precisely before they are potted, there are numerous pitfalls in "potting" the terminal portions of fibers in a resin which can be solidified. To begin with, one must find a resin which is sufficiently compatible with the fibers as to form a fluid-tight bond which will survive over the useful life of the module. After having found such a resin one must make sure that movement of the fibers near the resin does not damage the fibers due to the shearing action of the solid resin on their terminal portions, particularly if the pressure differential to be used in the module is substantial. Further, cutting and dressing the solid resin to expose the ends of the fibers may result in plugging many of the fibers.

As if these problems were not enough, one could not avoid having to cope with the geometry of the frame which was to support each arrangement of fibers, whatever it may be, in the bundle to be housed in a module. This required construction of the frame in such a manner as both, to facilitate potting of the terminal portions of the fibers, and also to provide adequate support for the fibers intermediate their potted terminal portions, so the fibers are not damaged by flow of the feed through the module.

We decided to eliminate the frame to avoid dealing with the problems endemic to using one. This approach required that we find some way to pot the terminal portions of the fibers and support the fibers intermediate their ends without using a frame.

We addressed the problem of potting the fibers by dispensing with potting the fibers. Instead, we have substituted a "split-clip" header comprising opposed flexible strips, each with a grid of parallel grooves in which the ends of the fibers are secured when the strips are joined. A "split-clip" header is so termed because, when opposing faces of upper and lower sections, at least one of which faces is grooved to snugly embrace a fiber, are joined with the terminal portions of the fibers between them, the joined sections serve to "clip" and mechanically snugly secure the fibers near their ends, between the faces.

The split-clip header performs the same function as the potting resin, except that it avoids the problems of potting; and, using the split-clip header at each end of a fiber assembly, referred to as an an "array of fibers" herein (an "array" for brevity), allows precise control not only of the planar orientation of the fibers in substantially parallel spaced apart relationship, but also of the transverse spacing between successive layers of fibers in adjacent fiber arrays in a stack (as will be explained in greater detail hereafter).

We addressed, and solved, the problem of supporting the fibers intermediate their ends, by not supporting them between successive layers with any framework structure. Instead we use relatively short lengths of fibers adapted to withstand the force of feed flowing over them without suffering damage due to shear exerted near the fibers' ends at the inboard face of a split-clip header.

It will be appreciated that, though the description of the invention herein is for "outside-in" flow of feed, the fiber array and a module containing a stack of arrays, may be equally well adapted for "inside-out" flow, for such process considerations demanding such flow.

The module of our invention, the method of constructing a cartridge, the frameless fiber assembly we use, the method of constructing a cartridge, and the effectiveness of an assembly of cartridges in a variety of permeation processes, address the deficiencies of the prior art.

SUMMARY OF THE INVENTION

It has been discovered that a stack of unit cells containing vertically spaced apart layers of fibers held near their ends may be reinforced by being post-potted in a single step, so that the fibers, though secured in only near-fluid-tight relationship, are again secured near their ends in an annular shell of potting resin. By "near-fluidtight" is meant that the stack need only contain the potting resin until it cures.

It is therefore a general object of this invention to provide a method of post-potting a stack of cells so as to form an unbroken annular shell of resin holding the fibers near their ends so that any leakage around them is stopped.

It has more specifically been discovered that by dispensing with a frame to avoid dealing with the problems of using one, and by dispensing with potting the terminal portions of fibers to avoid dealing with the problems of potting fibers, an unexpectedly effective, frameless array of hollow fibers may be constructed. Such a fiber array (or simply "array" hereafter, for brevity), though shapeless per se, allows one to tailor the array for a specific intended use. Opposed split-clip headers, at each end of an array, are disposed on suitable mounting means within the module to provide a geometrical shape of choice for the array. The split-clip headers are provided with peripheral through-passages referred to as "potting channels". Plural fiber arrays may be stacked on the mounting means, such as guide-pins, and bonded one to another, to form a circumferentially "near-fluid-tight" stack of arrays ("cartridge"), within a module.

It is therefore a general object of this invention to provide a novel, economical and surprisingly trouble-free module comprising a shell within which is axially operatively disposed a multiplicity of cells each containing an assembly of fibers, stacked one on top of the other, to form a near-fluid-tight "cartridge" which may be tailored to provide a predetermined pressure drop of feed; and, the bores of which fibers may be tailored to provide a predetermined resistance in the flow path of permeate.

It is a specific object of this invention to provide a module comprising a shell within which is axially operatively disposed a multiplicity of frameless arrays comprising hollow fibers with predetermined bores and wall thickness secured in split-clip headers, stacked one on top of the other, to form a fluid tight cartridge which may be tailored to provide a predetermined pressure drop of feed.

It is another general object of this invention to provide a novel and surprisingly effective cartridge of frameless arrays of hollow fibers in opposed split-clip headers having peripheral potting channels, each channel extending the length of an array of fibers and providing open communication between the upper and lower faces of each of the headers; and, further, when at least two arrays are interfitted to form a frame of four split-clip headers, the channels in the four headers are in open fluid communication with each other.

It is also a specific object of this invention to provide a stack in which shapeless and frameless arrays are given shape by tensioning the fibers of each array as desired, and a stack of such arrays is formed by bonding them together to form a unitary cartridge without particular regard to its central conduit is fluid-tight; to provide a cartridge having a near-fluid-tight conduit defined by plural split-clip headers, laminated one to another, through which conduit a feedstream to be treated flows over the fibers of the arrays, in transverse flow; and, to provide a cartridge in which one or more arrays are oriented transversely to the fibers in other arrays in the cartridge.

It is another specific object of this invention to provide arrays having substantially planar laminar split-clip headers with potting channels and stepped terminal portions referred to as "flanged ends" which are adapted to snugly fit successive arrays together in layers, the fibers of one array being orthogonal to those of another, so as to provide a cartridge of arrays. The periphery of a split-clip header, in plan view, may be of arbitrary shape (e.g. arcuate or linear) so long as plural split-clip headers form a cartridge with all peripheral channels in open flow communication when interfitted with other arrays. When the arrays in a stack are bonded, one to another, they form a cartridge which is enclosed in the shell of a module, mounted longitudinally, coaxially therein. When plural cartridges are mounted in the shell, the longitudinal axis of each cartridge may be horizontally or vertically displaced relative to the longitudinal axis of the shell.

It is still another specific object of this invention to provide a simple, essentially mechanical method for securing plural fibers in an array without potting them, then stacking plural arrays in near-fluid tight relation to form a cartridge, then post-potting the cartridge. Clearly, if the fibers and split-clip headers are secured in fluid-tight relationship prior to post-potting, then post-potting them serves only as insurance against leakage. In the method of forming a post-potted cartridge, (i) the fibers are trained in parallel spaced-apart relationship into longitudinal, laterally spaced apart grooves in lower sections (say) spaced apart by the length of the fibers, minus their terminal portions which are in the grooves; (ii) an upper section, preferably having upper grooves corresponding to lower grooves in a lower section, is placed congruently upon the lower section, preferably, frictionally securing the fibers near their ends; (iii) the upper and lower sections, and the fibers held therebetween, are bonded together to secure the fibers in near-fluid-tight relationship with the split-clip header; (iv) the arrays are stacked by interfitting the split-clip headers to form a stack in which the split-clip headers are held in near-fluid-tight relationship with potting channels axially aligned; (v) a potting resin is injected into the potting channels under sufficient pressure to fill the potting channels substantially without flowing out of the stack; (vi) the resin is cured; and (vii) the post-potted cartridge is removed from between the potting plates.

It also a specific object of this invention to provide a stack of frameless arrays having intercommunicating axial peripheral potting channels in each split-clip header, and to post-pot the stack so as to form a cartridge with an annular unbroken shell of potting resin around the terminal portions of all fibers held in the cartridge, making it possible to fluid-tightedly seal near-fluid-tight terminal portions of fibers in near-fluid-tight split-clip headers. Since the fibers are cut to length when an array is made, it avoids cutting the fibers after they are potted, and damaging the ends thereof, as is customarily done in the prior art.

It has still further been discovered that the cost of fabricating a module for separating the components of a high pressure feedstream can be minimized by confining the feed within the cartridge formed by plural laminated split-clip headers, in turn formed from laminar upper and lower sections of a synthetic resinous strip provided with peripheral potting channel and means for interfitting one array with another in a generally planar configuration. The fluid-tight conduit formed by the cartridge bears the pressure exerted by the feedstream, allowing the shell of the module to be designed for a relatively low pressure permeate. The pressure rating of the shell of the module is therefore substantially unrelated to the pressure of the incoming feedstream.

It is therefore another general object of this invention to provide a low cost, low pressure shell for a module which accepts a high pressure feedstream. The fibers in each array, irrespective of their length, are unsupported within the array except near their ends, by the opposed split-clip headers and a peripheral shell of potting resin. Relatively long fibers may be supported during operation, after they are sufficiently deflected, by a tension cord in a next adjacent array. When the drag (hydrodynamic forces) on the fibers is such as to deflect them substantially in the direction of flow, fibers in adjacent layers may touch and support each other. The length of the fibers is chosen as a function of the hydrodynamics of the feedstream.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which:

FIG. 3a is a cross-sectional view of the planar face of a split-clip header after the fibers are securely clipped into it, and the potting channel extending over the terminal portions of all fibers in the array;

FIG. 3b is a cross-sectional view of the planar face of a spit-clip header as in FIG. 3a, but after reinforcing threads are substituted for some of the fibers;

DETAILED DESCRIPTION OF PREFERRED EMBODIMENTS

Figure 1A:
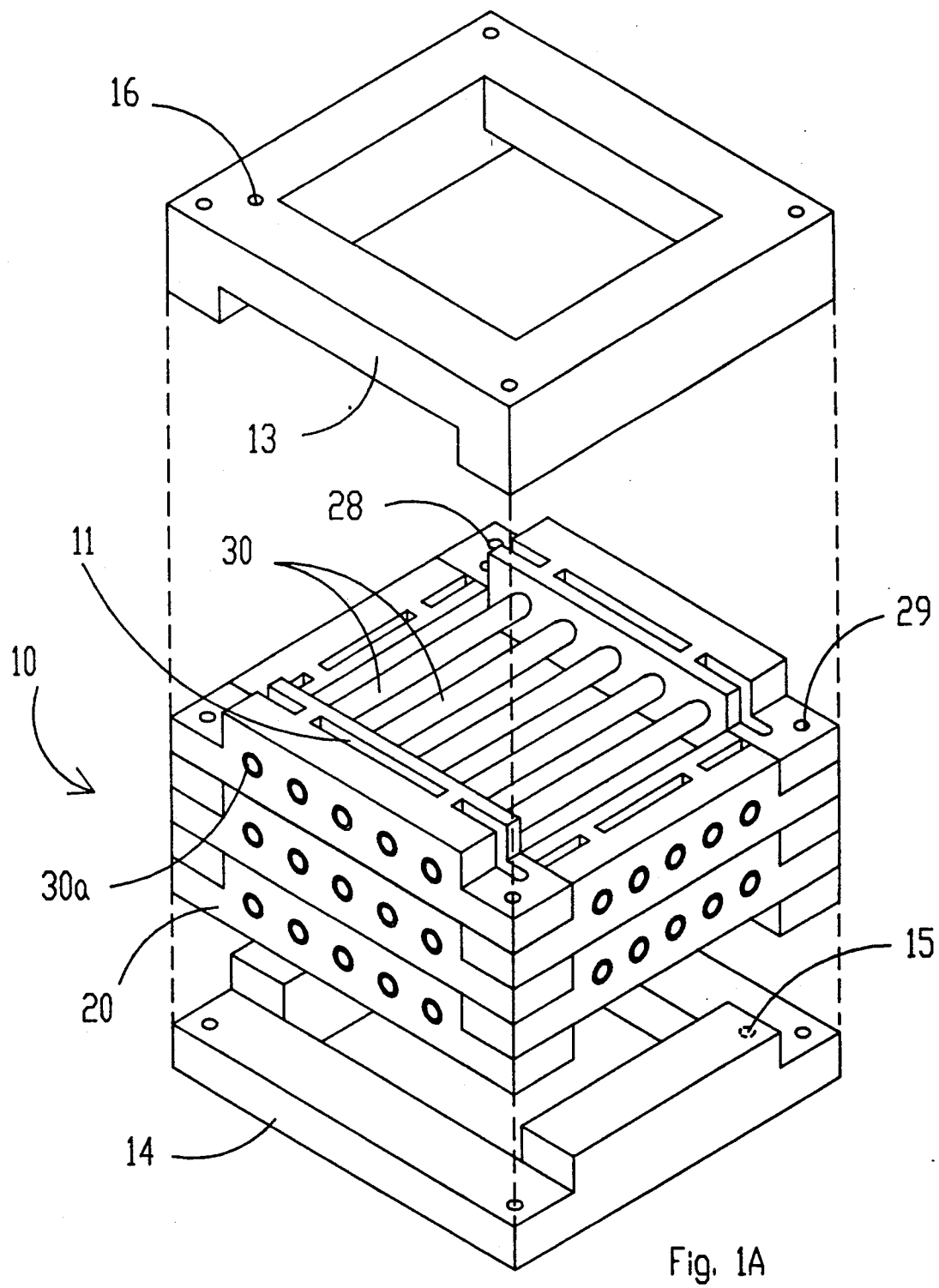
FIG. 1a is a perspective view of a cartridge of arrays shown between upper and lower potting plates; split-clip headers, each having an elongated potting channel are successively laminated one to another to define a substantially fluid-tight axial conduit; and the fibers in each layer are orthogonal to those in a next adjacent layer.

The module of this invention may be used in a fluid-fluid fractionation process of choice, and more generally, in various separation processes. The module is especially well adapted for use in ultrafiltration, reverse osmosis, and gas permeation processes; it may be used for dialysis, especially as an artifical kidney, for direct osmosis, gas-gas exchanges and liquid-gas exchanges.

The fibers used in an array may be formed of any conventional membrane material whether inorganic, organic, or, mixed inorganic and organic. Typical inorganic materials include glasses, ceramics, cermets, metals and the like. Ceramic membranes may be made, for example, as described in U.S. Pat. No. 4,692,354 to Asaeda et al (class 472/ subclass 244), U.S. Pat. No. 4,562,021 to Alary et al (class 264/subclass 43), and others. The organic materials are typically polymers, and are preferred, whether isotropic, or anisotropic with a thin layer or "skin" on either the bore side or the shell side of the fibers. Preferred materials for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly(ethylene terephthalate), and the like disclosed in U.S. Pat. No. 4,230,463 the disclosure of which is incorporated by reference thereto as if fully set forth herein.

The fibers are chosen with a view to performing their desired function and are non-randomly oriented in each array, and in the module, so that the flow of feed through the module is over the fibers and orthogonal thereto so as to be in transverse flow as disclosed in "Designing Hollow Fibre Contactors" by Mung-Chien Yang and E. L. Cussler in AIChE Jour., 32: 1910-1916 (1986).

For hollow fiber polymeric membranes, the outside diameter of a fiber is at least 100 $\mu$m (micron) and may be as large as about 10 mm, typically being in the range from about 0.1 mm to 2 mm. The wall thickness of a polymeric organic fiber is at least 10 m$\mu$ and may be as much as 1 mm. Ceramic/metallic tubular membranes have an outside diameter in the range from about 3 mm to about 13 mm. The wall thickness of a ceramic/metallic membrane is typically at least 25 $\mu$m and may be as much as 3 mm. Whether organic or inorganic, the wall thickness of a hollow fiber is typically in the range from about 5% to about 40% of the outside diameter of the fiber. The larger the outside diameter the less desirable the ratio of surface area per unit volume of module.

The average pore cross sectional diameter in a fiber may vary widely, being in the range from about 5 to 2000 Å. The preferred pore diameter for separation of components in a liquid feedstream is in the range from about 10 to 200 Å.

The length of a fiber in an array will depend upon the strength of the fiber, its diameter, the flow rate of feed over the fibers and the pressure of the feed, its temperature, and other considerations. Since the fibers are unsupported by a frame member, they are relatively short being in the range from 5 cm to about 0.5 meter.

Figure 1B:
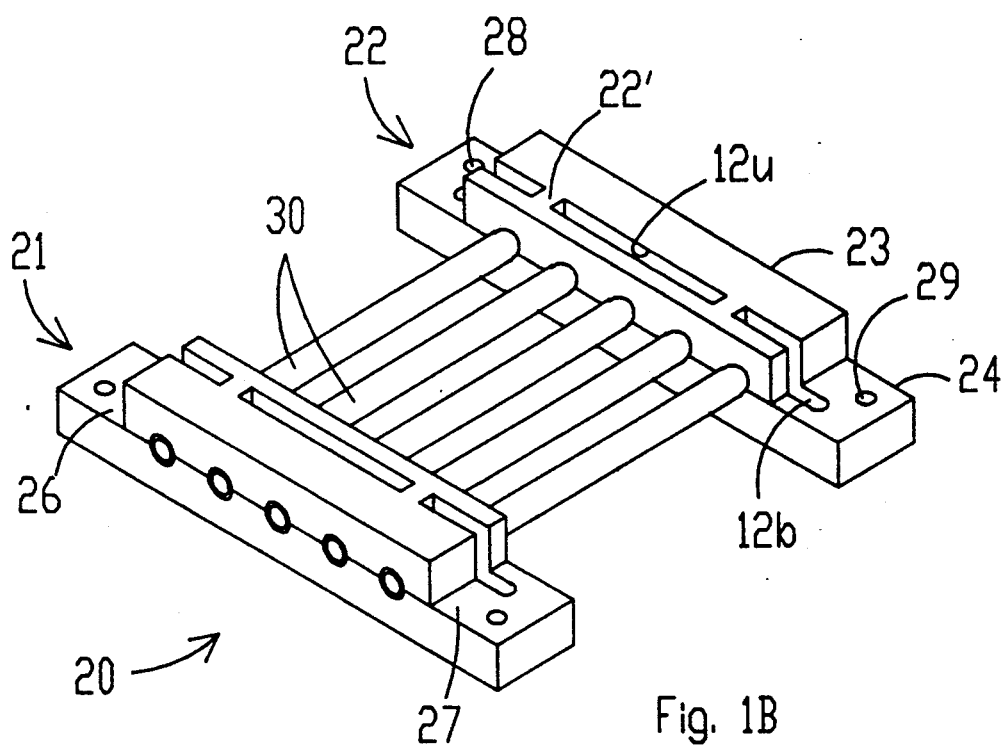
FIG. 1b is a perspective view of a single array of two mirror-image split-clip headers.

Referring to FIGS. 1a and 1b, there is shown a cartridge and an array thereof, indicated generally by reference numeral 10, of five arrays 20, each with plural fibers 30 lying in vertically spaced apart lateral planes. Because each array is frameless, the cartridge is formed by inserting aligning rods (not shown) vertically through bores 28 and 29 in lower sections 24 of each split-clip header to interfit them in a stack. The stack is then sealed, or nearly sealed, by bonding the peripheries of the split-clip headers, preferably by coating them with adhesive before they are stacked. Alternatively, the stack may be held tightly between upper and lower potting plates 13 and 14 respectively to provide a near-fluid-tight zone around the exposed fibers.

The cartridge is then post-potted with a resin 11 to fill potting channels 12 in each header, using the upper and lower potting plates 13 and 14, respectively, as will be described hereafter. Each potting channel 12 is formed by an upper channel 12u in upper section 23 and lower channel 12b in lower section 24, channel 12u overlying channel 12b; the ends of the channels 12b are aligned in open communication.

Figure 4:
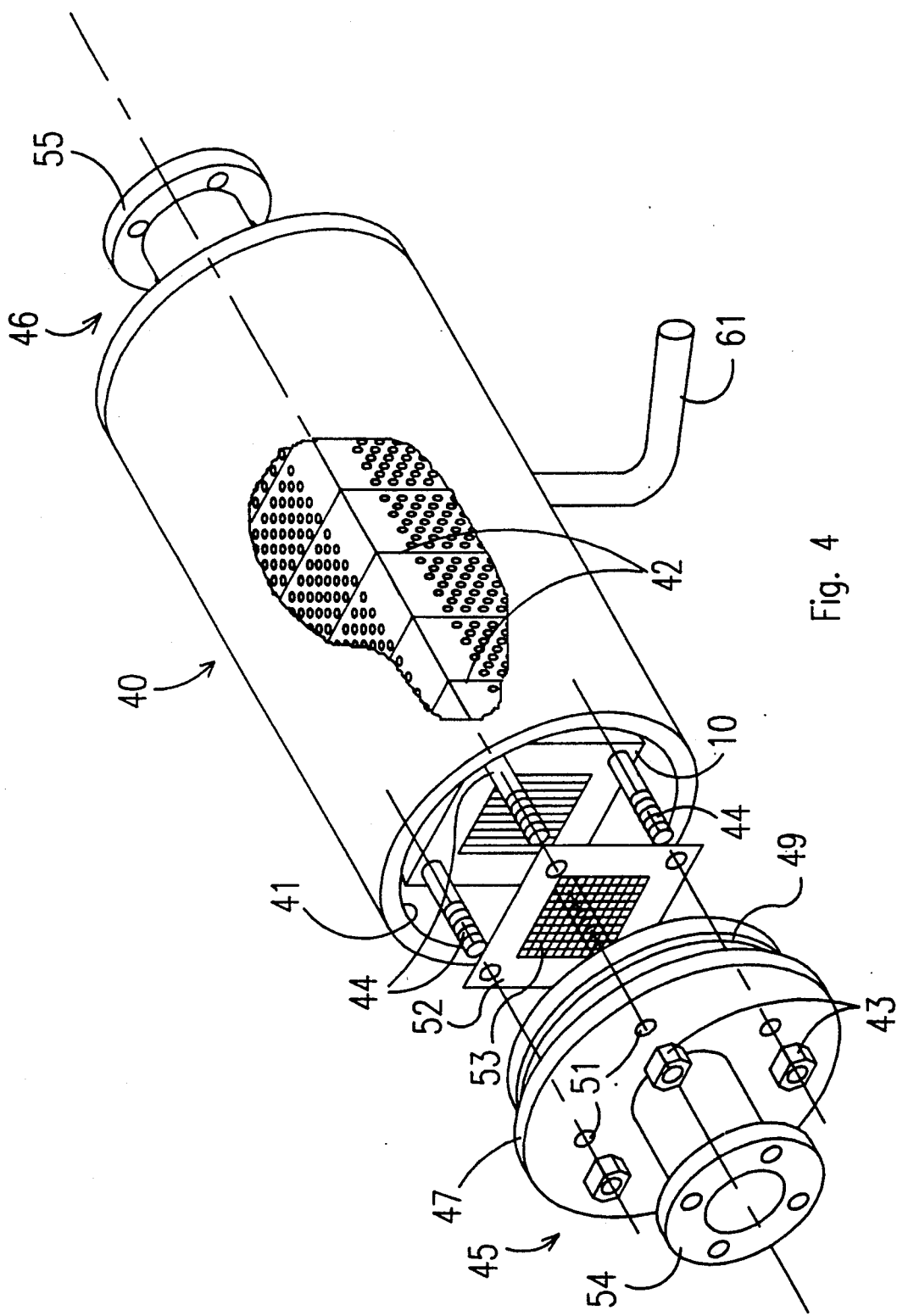
FIG. 4 is a perspective view of a first module with portions broken away and exploded, showing a stack of cartridges axially aligned in a cylindrical shell.

When several cartridges 10 are operatively disposed within a module, along its longitudinal axis, as shown in FIG. 4, the fibers are oriented in the vertical and horizontal directions (preferably alternatingly), both of which directions lie in a plane at right angles to the longitudinal axis.

Each of the fibers 30 is captively snugly held between the split-clip headers 21 and 22, in a through-passage or "groove" (see FIG. 2a) defined by opposed inner faces of the upper and lower section 23 and 24 respectively. The upper section 23 is shorter than the lower section 24 so as to result in stepped portions 26 and 27 flanking each upper section 23. Tie struts 23 (formed when injection molding the upper section) lying above the grooves connect the portions of the upper section on either side of the potting channel. Each section is formed from laminar strips of inert material unreactive with the feedstream or any component thereof.

The fibers extend between oppositely disposed split-clip headers. The particular material from which the sections are formed is not narrowly critical, provided the opposed inner face of at least one section, and typically both sections, can be adequately grooved with grooves 25 and 25' (FIG. 2a) to secure a terminal portion of each of the fibers, and the opposed inner faces of the sections can be joined to form an integral split-clip header.

Figure 2A:
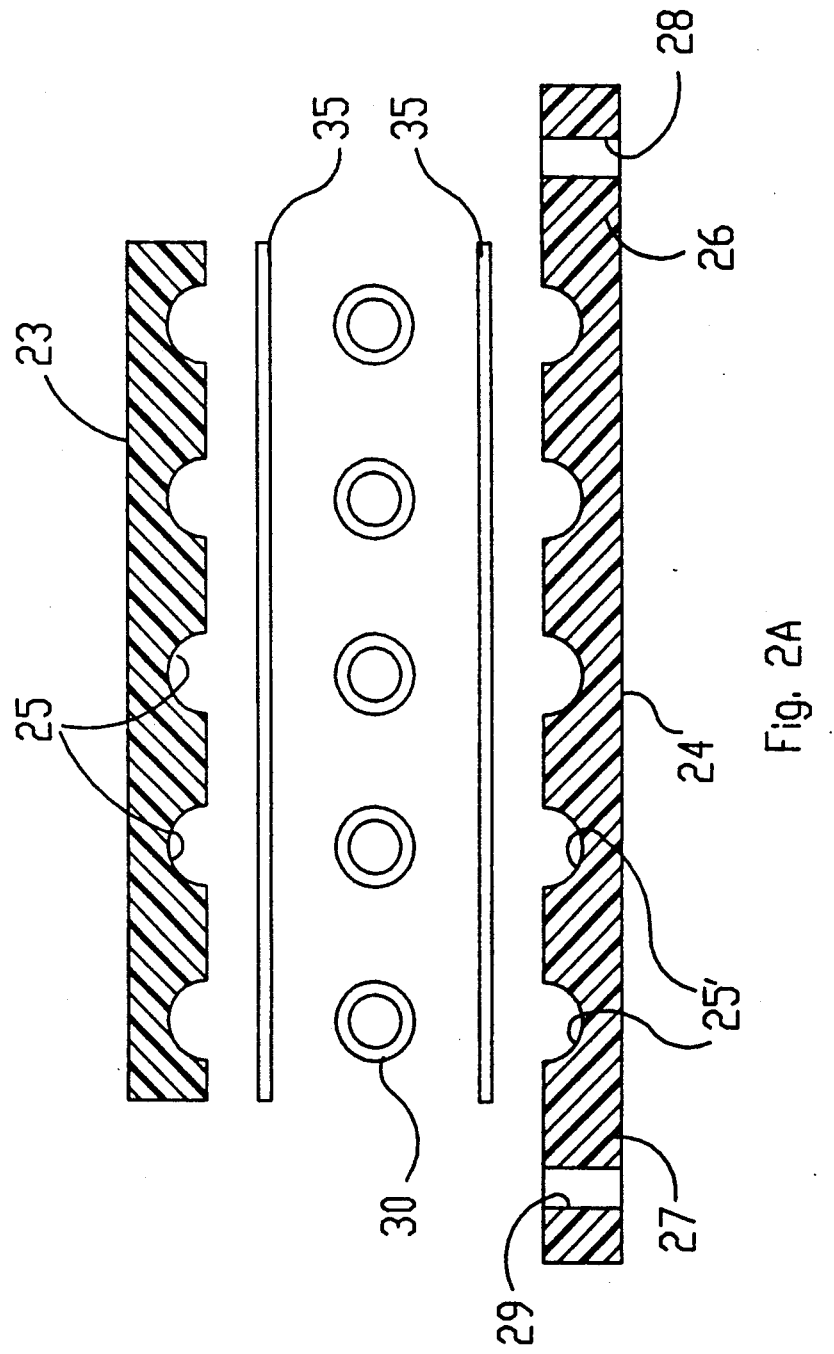
FIG. 2a is a cross-sectional elevational exploded view showing the construction of a split-clip header securing the fibers between sealing strips and opposed similarly grooved sections; the upper section having a potting channel extending at least the width of the array of fibers, and the lower section having a longer potting channel than the one in the upper section.
Figure 2B:
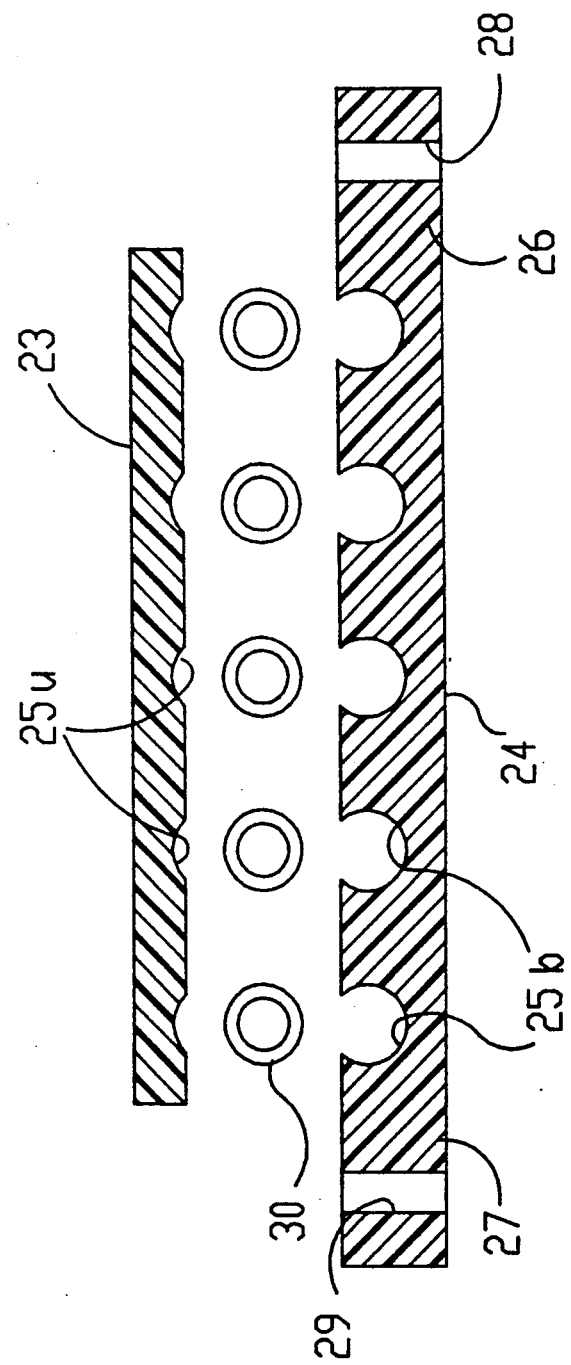
FIG. 2b is a cross-sectional elevational exploded view showing the construction of a split-clip header in which the fibers are secured between opposed differently grooved sections with overlying potting channels.

As shown in FIGS. 2a, and 2b, the grooved portions of each equally thick section are mirror images of one another, each groove having a substantially semi-circular end-elevational profile for ease of manufacture. However, as illustrated in FIG. 2b, the profile of the groove in one section may extend over a greater arc than a semi-circle (shown in the lower section in FIG. 2b), if the arc in the opposed inner face is about correspondingly diminished to provide a groove having a cross-sectional area which is essentially the same as that of the cross-section provided by the fiber's outer diameter. The fibers may be held as described, because the wall of a fiber is relatively thick and the fiber is circumferentially compressible, so that the fiber can be pressed into a bottom groove 25b before an upper section 23 with upper groove 25u is placed over the fiber, snugly to capture the fiber's terminal portion without blocking the bore of the fiber.

The width of each section of a split-clip header is sufficient to provide adequate support for, and negate damage to, the terminal portions of the fibers when subjected to the force of the incoming feedstream and to meet the structural requirements of the module. Each section may be from about 10 mm to about 50 mm wide, the thickness depending upon the outside diameter of the fibers. Though the thickness of a section is at least about one-half the outside diameter of a fiber, a preferred thickness is about the diameter of a fiber.

When the sections are joined together with the fibers therebetween, the thickness of a split-clip header will preferably range from about 2 to about 5 times the outside diameter of a fiber to enable one to provide a desirable packing density of fibers. Such packing density may be high enough to force some of the fibers into contact with fibers in a next-adjacent array, to stabilize the fibers in the stack.

The void space within a stack may be in the range from about 20% to about 85% of the internal volume of the stack's central conduit, depending upon the particular end use of the stack in a module. The essential distinguishing feature of the packing density in a stack of this invention is that the packing density is less a function of the outside side diameter of the fibers used, than it is a function of the thickness of the split-clip headers used to produce the arrays. For example, for fibers having diameter "d", positioned with a transverse pitch "$P_t$" in an array, and a longitudinal pitch "$P_l$" between adjacent arrays, the packing density ($m^2/m^3$) and the resulting void fraction (%) may L be calculated. When $P_t = P_l = 1$, the limiting case when the fibers are just touching, the minimum void fraction obtained is 21.46%. The void fraction would be slightly less if the fibers were forced against each other hard enough to make a substantial impression on each other.

Realistic void fractions and packing densities with varying transverse and longitudinal pitches for fibers having d = 0.7 mm are set forth in Table 1 below:

TABLE 1

| $P_t$ | $P_l$ | Void fraction (%) | Packing density ($m^2/m^3$) |
|---|---|---|---|
| 1.1 | 1.0 | 28.6 | 4080 |
| 2.0 | 1.0 | 60.7 | 2244 |
| 2.0 | 1.2 | 67.3 | 1870 |
| 4.0 | 1.2 | 83.6 | 1118 |

Arrays are preferably stacked to provide a void fraction in the range from 25% to about 70% within a stack, and it will be found that the diameter of a typical hollow fiber does not substantially affect the void fraction.

Individual fibers 30 (FIG. 1a) extend generally parallel to one another and end portions of the fibers extend through the split-clip headers so that the fibers' open ends 30a are exposed at outer faces of the split-clip headers 21 and 22. In an array (FIG. 1b), the center-to-center spacing of fibers in the horizontal plane preferably ranges from about 1.8 to about 3 times the outside diameter of a fiber. The choice of fiber spacing and thickness of split-clip header will determine packing density of the fibers. Such density is chosen to provide the maximum membrane area per unit volume of module without adversely affecting the flow of the feedstream through the cartridge. The result of forming a cartridge of frameless arrays and feeding the feedstream across the fibers is that permeate is discharged in opposite directions from the bores of fibers while the concentrate is discharged longitudinally through the module.

Referring again to FIG. 2a there is shown an exploded view of one of the split-clip headers 21 or 22 which comprises an upper section 23 and a lower section 24. The lower face of upper section 23 is provided with plural longitudinal grooves 25', each having about a half-pipe profile, in parallel spaced apart relationship. The upper face of lower section 24 is also provided with plural longitudinal grooves 25 with corresponding half-pipe profiles. The radius of each of the grooves is chosen so as to snugly embrace the arcuate outer circumferential portion of a fiber 30, near its end, when the upper and lower faces of the sections 23 and 24 are bonded tightly together.

The length of the terminal portion of a fiber held in the split-clip header will typically range from about 0.5 cm to about 5 cm, preferably from about 1 cm to about 2.5 cm, depending upon the diameter and length of the fiber between opposed split-clip headers, inter alia. A fiber 0.7 mm in diam. and 10 cm long may be held by terminal portions 1 cm long near each end. A fiber of the same diam. and 50 cm long may be held by terminal portions 2.5 cm long near each end, or by only 1 cm. From about 5% to about 50% of the overall length of a fiber may be used to secure it in the split-clip headers of an array.

The periphery of the cross-section of the stack shown in FIG. 1a (taken in a plane normal to the longitudinal flow axis of the stack) is square, so that all split-clip headers and the flanged ends of each split-clip header, in particular, have the same dimensions. One of the sections (the upper one in this embodiment) is shorter than the other (lower one) but of the same thickness, so that the latter provides the flanged ends 26 and 27 in which through-bores 28 and 29 respectively are provided to mount the array on guide pins of a mounting means in the module. The flanged ends are the terminal portions of a strip of flexible laminar material (and half the thickness of the body of the split-clip header because both sections are preferably of the same thickness), and, as long as the strip is wide. This provides a desirable geometry for the corner of the cartridge.

The means provided for interfitting the arrays to form the cartridge is not narrowly critical, but in view of the relatively high packing density demanded in a stack, which in turn determines that the split-clip headers be relatively thin, it will be evident that the flanged ends provide a dual function - they permit potting channels in successive arrays to be aligned in open fluid communication, and they provide a uniquely convenient and economic mounting means. For example, some of the arrays may be flangeless, being simply held by longitudinal compressive forces, between assemblies of flanged arrays. However, it will be immediately evident that, the structural requirements of providing fluid-tight seals between the flanged and unflanged arrays, is unlikely to make such an arrangement a preferred one.

Each array, if formed from a flexible hollow fiber, has no structural shape in that each of the two split-clip headers are displaceable in any direction relative to the other, the displacement being limited only by attachment to the fibers. However, when the hollow fibers are hollow membranes of ceramic or metallic material, the array will be rigid. In either case, when two arrays are assembled, their four split-clip headers form a rectangular assembly of interfitted split-clip headers with the fibers in one array being vertically spaced apart from those in the next adjacent array, the spacing being determined by the thickness of the split-clip headers.

It will now be evident that a cartridge of arrays, bonded one to another, seriatim, form an elongated conduit having a wall thickness which is determined by the width of strips from which the upper and lower sections are produced, and not the thickness of a strip. Such a strip, though relatively thin, is rigid in that, when on edge, it cannot be bent in a plane at right angles to the edge. However, because the strip is relatively thin and flexible, it is easily bent in a plane at right angles to its longitudinal edges.

In an analogous manner, it will now be evident, as illustrated in FIGS. 8-11, that a cartridge 110 with a circular periphery may be constructed with arrays of fibers 130 held in split-clip headers 121 and 122 having quadrant peripheries and arcuate flanged ends 126 and 127, so that when two pairs of arrays are interfitted to form an annular header assembly, fibers of varying (chord) lengths in one array are orthogonal to, and vertically spaced apart from fibers in the other.

Figure 10:
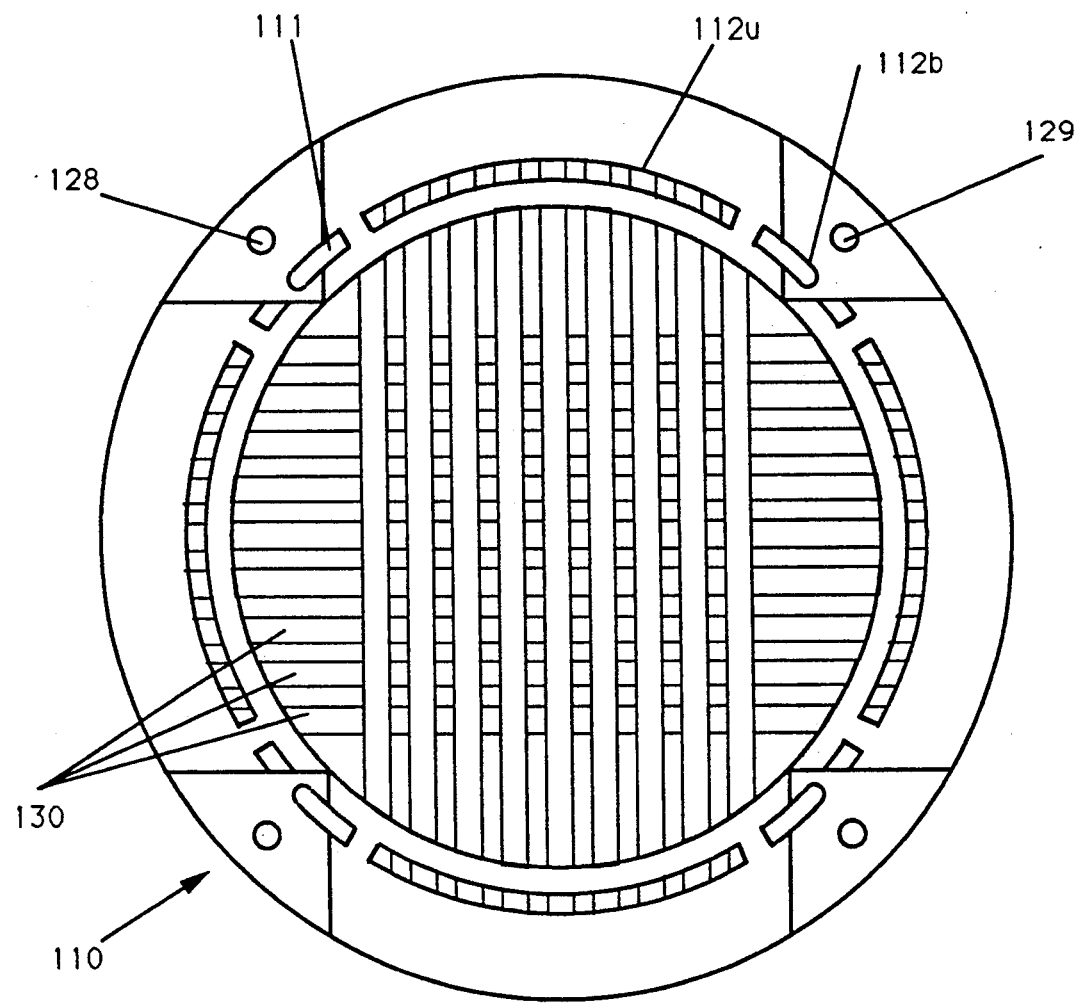
FIG. 10 is a plan view of a cartridge of a stack of round split-clip header segments showing an orthogonal relationship between the uppermost layers of fibers, and illustrating that the ends of successive potting channels are in open communication with one and another.
Figure 11:
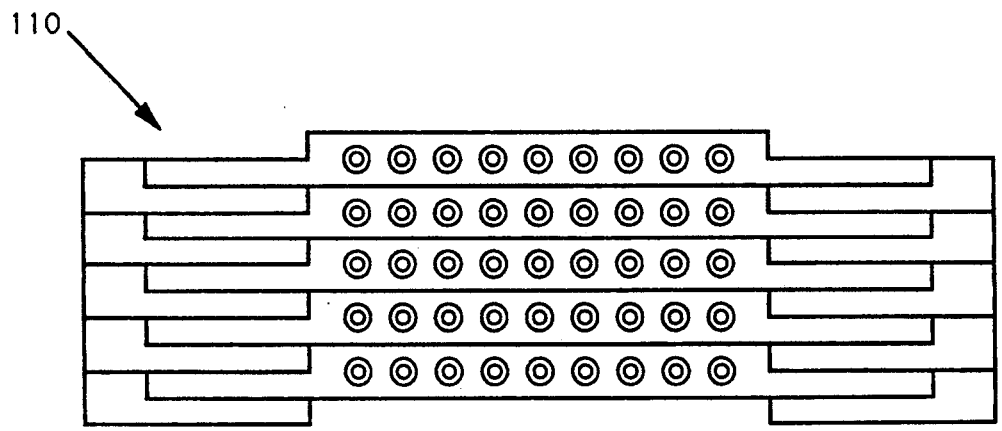
FIG. 11 is an end elevational view of the cartridge shown in FIG. 11 showing the near fluid-tight disposition of successive arrays before they are potted with a viscous potting resin which is held within the annular potting channels.

Each split-clip header 121 and 122 is provided with upper and lower sections 123 and 124, each with congruent potting channels 112$u$ and 112$b$, the lower channel 112$b$ extending beyond the upper channel 112$u$. The upper sections are provided with tie-struts 125 lying above the grooves in the upper section, which tie-struts keep the upper section together. The lower sections 112$b$ are provided with through-bores 128 and 129 for mounting the cartridge 110. As seen in FIG. 10, the potting channels of a stack of arrays is filled with resin 111 after securing the stack between upper and lower potting plates (not shown).

Cartridges with geometries having still other peripheries (for example, a rectangle with unequal sides, or, an ellipse) may be constructed in an analogous manner, if desired, but square and circular stacks are most preferred for obvious reasons.

Irrespective of the shape of the periphery of the cartridge, the fibers must resist the drag force of the feedstream without being damaged. This requires that the tension in the fibers be maintained below a force which is sufficient to extend the fiber beyond its elastic limit.

The foregoing is particularly applicable when the fibers are formed from an organic polymeric material and they are held in synthetic resinous split-clip headers. An array may also be formed with ceramic or metallic hollow membranes which are held in ceramic or metallic split-clip headers, though such inorganic membranes may also be secured in synthetic resinous materials having adequate thermal properties.

It is not essential that the fibers be assembled in fluid-tight relationship with the sections of a split-clip header because a stack will be post-potted. At least near-fluid-tight assembly of a stack of arrays is required so that a substantial amount of injected resin does not flow out of the interfitted split-clip headers. Near-fluid-tight assembly of a stack may be effected by simply smearing an appropriate adhesive over the opposed faces of each section, and optionally, the fibers, and pressing the sections against each other. An alternate means (shown in FIG. 2$a$) for securing the fibers is with a thin strip 35 of fusible, preferably thermoplastic, synthetic resinous material, or of hot melt adhesive or other bonding agent, which persists in the integrally bonded split-clip header as a non-selfsupporting film from about 10 $\mu$m to about 500 $\mu$m thick.

The manner in which the sections 23 and 24 are bonded is not critical so long as their inner opposed surfaces, and the outer surfaces of the fibers are bonded well enough to contain the potting resin injected. Typically a resin such as Ciba Geigy GY6010 with an appropriate fast-setting hardener is used at room temperature and elevated pressure from about 2 psig to 10 psig. The locations of the fibers in the array, namely their longitudinal and transverse pitches, are determined by the grooves and not the bonding agent. Unless a module is constructed with a stack in which the fibers of at least some arrays are deliberately always in contact with fibers in a next-adjacent array, fibers in successive arrays are preferably essentially free from contact, not only with one another in the same array, but with fibers in an adjacent array. In a preferred embodiment, it is only during a module's operation, under flow conditions which cause the fibers to sag, that there may be contact between fibers in adjacent arrays, which thus support each other.

The particular method of bonding the fibers between the sections of the split-clip header is not narrowly critical, the choice being dependent upon the materials of the split-clip header and the fiber, and the cost of bonding. Use of a compatible adhesive mainly ensures that the mechanical grip exerted by the opposed grooves around a fiber, is fluid-tight. The same or different adhesive may be used to bond successive split-clip headers to form a cartridge.

Preferred adhesives are polyvinyl ethyl ethers, copolymers of acrylate ester with acrylic acid, epoxy resins and the like which form a fluid-tight bond between the fibers and the sections of the split-clip header at a temperature below that which is deleterious to the integrity of the array, and the fibers in particular.

Bonding may also be effected by "welding" the surfaces to be joined by temporarily changing them to a plastic state, whether fluid or semi-fluid, at the interface of the joint. Such "welding" may be effected by solvent welding, or by pressing preheated molten surfaces together while in the plastic state; or by the use of heat energy-creating techniques such as heating with hot air, or vibration welding; all the foregoing techniques being well known to be readily adaptable for the purpose at hand by one skilled in the art. More preferred is the use of ultrasound waves for ultrasonic welding, or welding by dielectric heating, as described for example in U.S. Pat. No. 3,620,875 to Guglielmo, requiring the use of a ferromagnetic filler in a strip (such as strip 35) interposed between the sections of the split-clip header and fiber. A preferred choice of materials for the split-clip header and the fibers is one in which the materials are weld-miscible so that the lap strength of the resulting weld is comparable to that of one of the materials itself.

The materials for the sections of the split-clip header are most preferably either thermoplastic or thermosetting synthetic resinous materials, optionally reinforced with glass fibers, boron or graphite fibers and the like. Thermoplastic materials are preferred for relatively low temperature service below 100° C., these being chosen so as to be sufficiently compatible with the material of the fibers to produce a lasting, fluid-tight bond. Such thermoplastic materials may be crystalline, such as polyolefins, polyamides (nylon), polycarbonates and the like, semi-crystalline such as polyetherether ketone (PEEK), or substantially amorphous, such as poly(vinyl chloride) (PVC) and the like.

The number of fibers in an array is arbitrary, typically being in the range from about 10 to about 1000. By way of illustration, if each of the split-clip headers 21 and 22 is 30 cm long, 150 fibers each 1 mm (o.d.) may be used.

The result of a successful bond between the sections of the split-clip header and the fibers is illustrated in FIG. 3a. The end elevation in FIG. 1a shows the face of an integrally bonded cartridge in which the demarcation between upper section 23 and lower section 24 is substantially obliterated. The bores 31 of the fibers 30 are in open fluid communication with the shell exteriorly of the stack. Thus the cartridge is fluid-tight except for permeate coming through the bores.

To post-pot the cartridge and form an annular ring of cured resin to enhance the circumferentially fluid-tight arrays, the cartridge of adhesively bonded split-clip headers is placed between upper and lower potting plates 13 and 14 which are usually the same material as the split-clip headers. The potting plates become part of the cartridge after the potting is completed. The stack of arrays and potting plates are clamped in a fixture adapted to inject the resin. The fixture clamps the upper and lower faces of the cartridge in nearly fluid-tight engagement with the surfaces of the potting plates, and resin is injected into lower bore 15 filling the potting channels, until it exudes through diagonally opposed upper bore 16. The potting resin is typically an epoxy, silicone rubber, or mixture of monomers which form a copolymer upon free radical polymerization, or other flowable conventionally used resin.

Referring to FIG. 4, there is schematically illustrated a module in perspective view, with portions broken away, to show a stack of cartridges 10 which are held therein. Because, as explained hereinabove, and illustrated in FIG. 1a, each assembly of two arrays provides orthogonally crossed layers of fibers in the assembly, it is seen that the bores 31 of the fibers 30 discharge permeate in four directions at right angles to each other, into the permeate side of the shell.

The stack is received within a relatively closefitting cylindrical shell 40 having machined inner end surfaces, only one of which 41 is visible, the other end surface being at the other end of the shell. Four guide pins 44 extend through the corner regions of the assembled stack of cartridges and protrude through the ends of the cylindrical shell. The ends of the guide pins are threaded so as to allow the stack of cartridges to be through-bolted, tightly compressing the upper and lower faces of all the cartridges in a stack, one against the other in fluid-tight relation, preferably with gasket means 42 between successive cartridges.

Essentially identical fluid couplings 45 and 46 at the ends of the shell serve to direct the flow of a feedstream over the fibers within the stack. Coupling 45 includes a stepped flange 47 with machined, highly finished surfaces, the step being dimensioned to fit inside shell 40 in fluid-tight engagement and against the end face of stack 10. The rods 44 and nuts 43 serve to provide enough pressure on the assembly comprising the shell 40, fluid couplings 45 and 46, and the stack of arrays, to confine the feedstream within the stack. Apertures 51 are provided in coupling 45 to receive the rods 44.

An O-ring 49 provides a fluid-tight seal between the coupling 45, especially the stepped flange 47, and the surface 41 inside the shell 40, to ensure that no portion of the permeate leaks over the exterior of the shell. A gasket 52 provides a seal between the inner face of the coupling and the assembly of arrays at each end of the stack, preventing the feedstream from leaking into the permeate side. The gasket 52 is provided with a filter screen 53 to trap large pieces of solids which might damage the fibers.

The two fluid couplings 45 and 46 are provided with flanges 54 and 55, respectively, for attachment to appropriate fluid conduits which deliver the untreated feedstream, and lead away the treated feedstream or concentrate. A permeate outlet from the shell is indicated at 61.

The module in the form shown in FIG. 4 is particularly well-adapted for use in a filtration operation. Fluid under elevated pressure in the range from about 120 kPa (3 psig) to about 5000 kPa, is introduced through coupling 45 to flow transversely over the fibers in the stack. Components of the feedstream capable of passing through the membranes under the transmembrane pressure generated, permeates through the walls of the fibers and into the permeate side of the shell, and leaves through permeate outlet 61, while the remaining components of the feedstream (the concentrate) leave through the coupling 46.

It will now be appreciated that another module, analogous to the one shown in FIG. 4, may be used as a mass transfer device to perform fluid-to-fluid transfer operations between any appropriately chosen first fluid flowing through the lumen of the fibers 30, and another appropriately chosen second fluid flowing through the stack externally to the fibers, provided the module is also fitted with an inlet (not shown) for the first fluid. The outlet for the first fluid is furnished by the permeate outlet 61 of the module. To force the first fluid to flow through the lumen of the fibers, a fluid-tight seal is provided between the inside surface of the shell and two diagonally opposite edges of the stack.

Since the length of fibers in an array is necessarily relatively short because they are unsupported by a frame member, one skilled in the art is driven to use as long a fiber as one can. This is particularly true in those instances where the ratio of membrane area to the volume in which they are held (the flow-through zone provided by the conduit within the stack) is to be maximized for minimum cost. The sag in fibers subject to a drag sufficient to cause fibers in one array to contact those in the next adjacent array, may be minimized by inserting tensioning cords or strands in each array, or alternate arrays, preferably in each array. It will be appreciated that such cords, when used, do not support the fibers in the array containing the cords, but will support a next adjacent array. The cords also help maintain the geometry of the split-clip headers under high pressure operation.

As illustrated in FIG. 3b there is shown an end view of an array in which cords 62 of nylon, polypropylene, or other sufficiently strong polymeric material, are secured within grooves in opposed split-clip headers. As shown in FIG. 3b, a tension cord is provided after each two fibers in an array, but cords may be inserted either more, or less, frequently, depending upon the service of the module.

Figure 5:
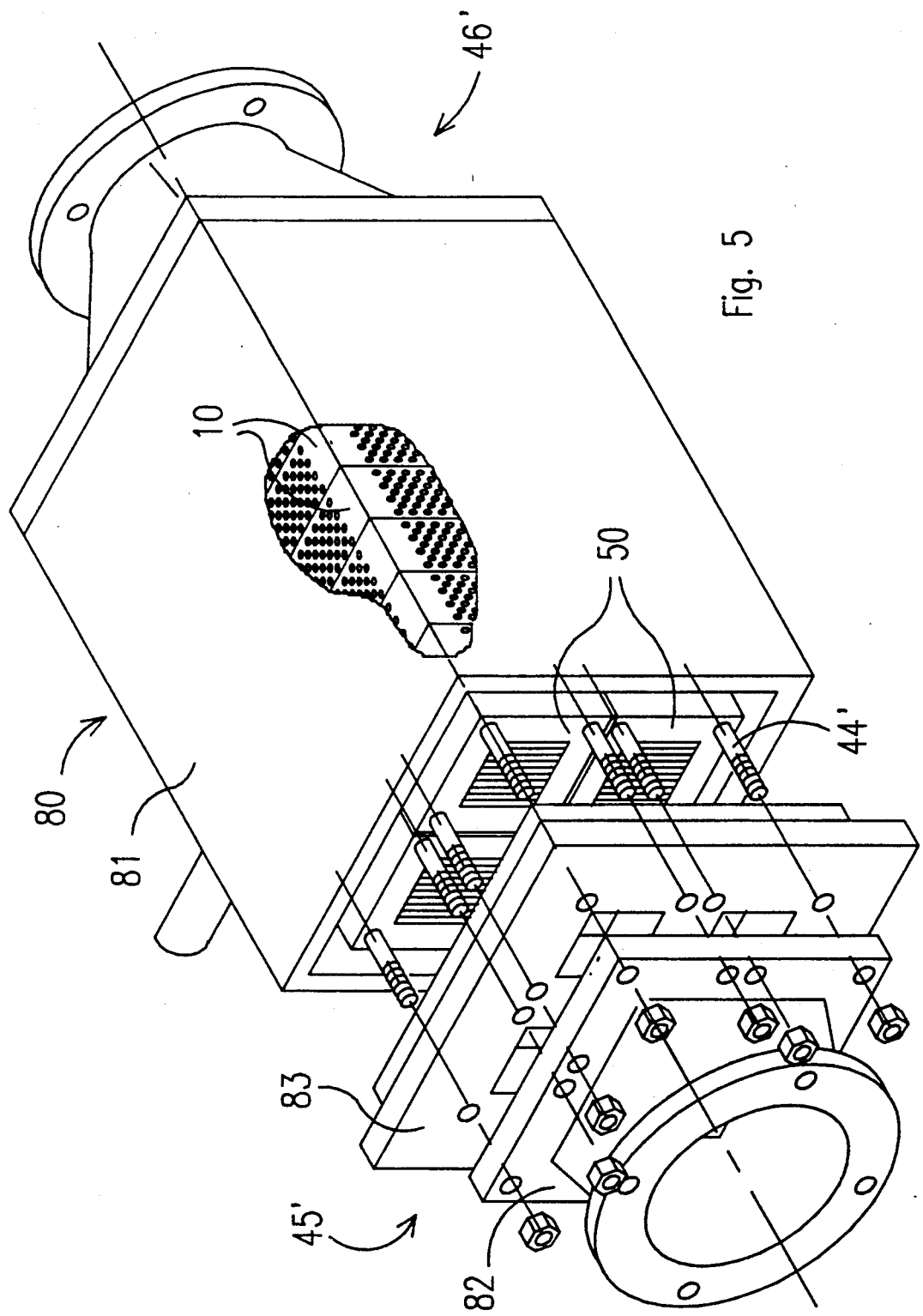
FIG. 5 is a perspective view of a second module with portions broken away and exploded, showing four stacks of cartridges packed side-by-side in a rectangular shell, each cartridge configured as shown in FIG. 1.

Instead of using longer fibers and tension cords in an array, a high ratio of membrane surface area to stack conduit volume may be obtained by "ganging" plural stacks of cartridges in a single shell, as schematically illustrated in the module indicated generally by reference numeral 80 in FIG. 5. The module 80 is similar to the module illustrated in FIG. 4 except that module 80 has a shell 81 with a rectangular cross section, and the shell is fitted with four stacks 10 of cartridges (not individually visible).

The individual stacks, in side-by-side fluid-tight relationship, are each denoted by reference numeral 50. Three of the four stacks of modules are visible in FIG. 5. Each stack is provided with a set of four guide pins 44' which extend through corner regions of the stack. All the guide pins project from the ends of the shell and are used to clamp the fluid couplings 45' and 46' in a manner analogous to that described for the module of FIG. 4 hereinabove. Since the bores of fibers in contiguous walls of contiguous stacks will not be aligned, the flow of permeate from one stack to another will be blocked. Since the bores of the fibers may not be aligned, the permeate is collected at one end of the fibers.

As illustrated, a two-part fluid coupling comprising an outer part 82 and an inner part 83, optionally with appropriate gasketing (not shown), together provide the analogous function of the coupling in FIG. 4, namely to ensure that the feedstream is directed only over the fibers in the stack of arrays, and not into the permeate side of the shell.

Figure 6:
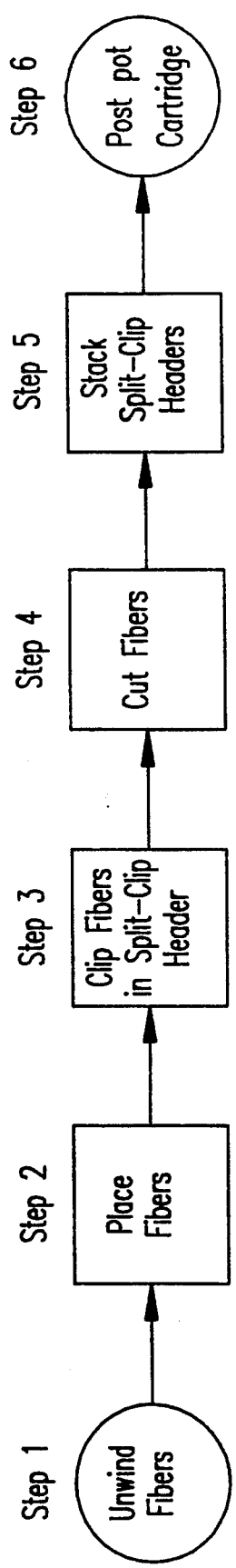
FIG. 6 is a flow chart illustrating generally the main steps in the manufacture of a cartridge.

To emphasize how a cartridge is constructed, the main steps in the overall process for producing a stack of split-clip headers and post-potting the stack, are schematically illustrated in the representation of a production line set forth in FIG. 6. In the first step (1), individual fibers are drawn from plural spools on a creel, and while maintaining suitable tension on the fibers, they are collimated, held in spaced-apart relation with a comb. In the second step (2), the fibers are placed in a planar configuration over the grooves of several aligned lower sections of split-clip headers. Each section is preferably previously injection molded to provide precisely dimensioned grooves, but each section may also be machined, extruded, or hot-stamped to provide appropriate grooves dimensioned to accept the fibers. The grooved surfaces of the lower sections are preferably primed in accordance with the requirements of the bonding or "welding" procedure of choice. The upper sections of the split-clip headers, preferably also primed, are then positioned over the lower sections to enclose the terminal portions of the fibers. The upper and lower sections are then bonded to each other to form the split-clip header in the third step (3). The fibers are then cleanly severed in the fourth step (4) to leave a substantially planar end face on each split-clip header. The split-clip headers are stacked in step (5) with potting plates at either end and placed in the potting fixture. In step (6) the stack is injected with resin and allowed to cure before the cartridge is removed from the fixture.

If tension cords are to be placed in each array, the creel is provided with the appropriate spools from which individual tension cords are fed through the comb alongside the fibers, drawn over the lower sections, and enclosed. Each of the arrays thus formed has the same number of fibers (and tension cords, if used), each having the same length, and all are secured in mirror-image split-clip headers having essentially identical dimensions.

It will now be evident that the final step of assembling cartridges of the arrays in the shell of a module is simply a matter of sliding cartridges over the guide pins, preferably with gaskets 42 between the surfaces of contiguous cartridges, or adhesive if the cartridges are not to be disassembled, and securing them in fluid-tight engagement.

Figure 7:
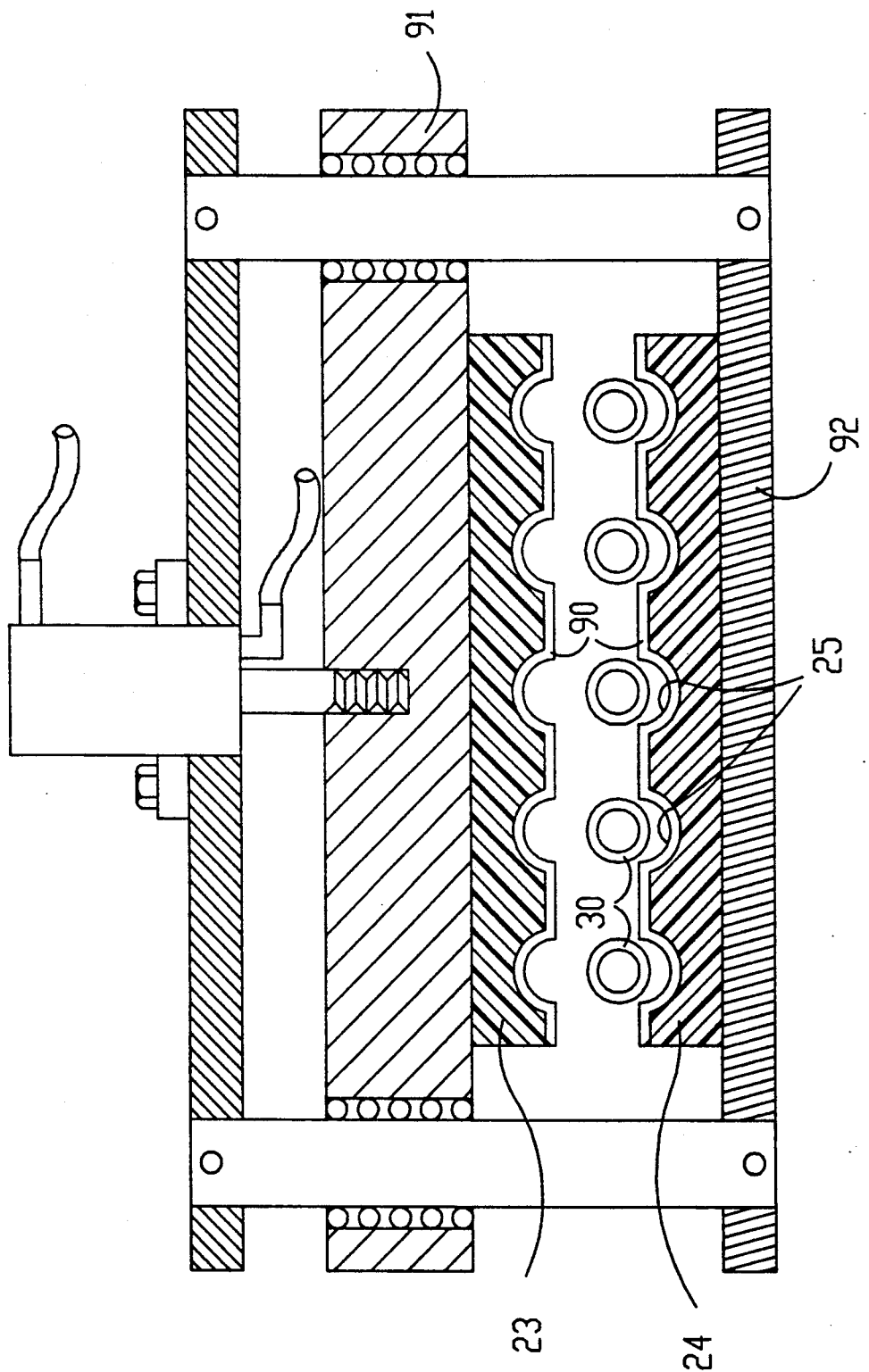
FIG. 7 is an end elevational view of a press in which a split-clip header is bonded to securely hold the fibers in an array.
Figure 8:
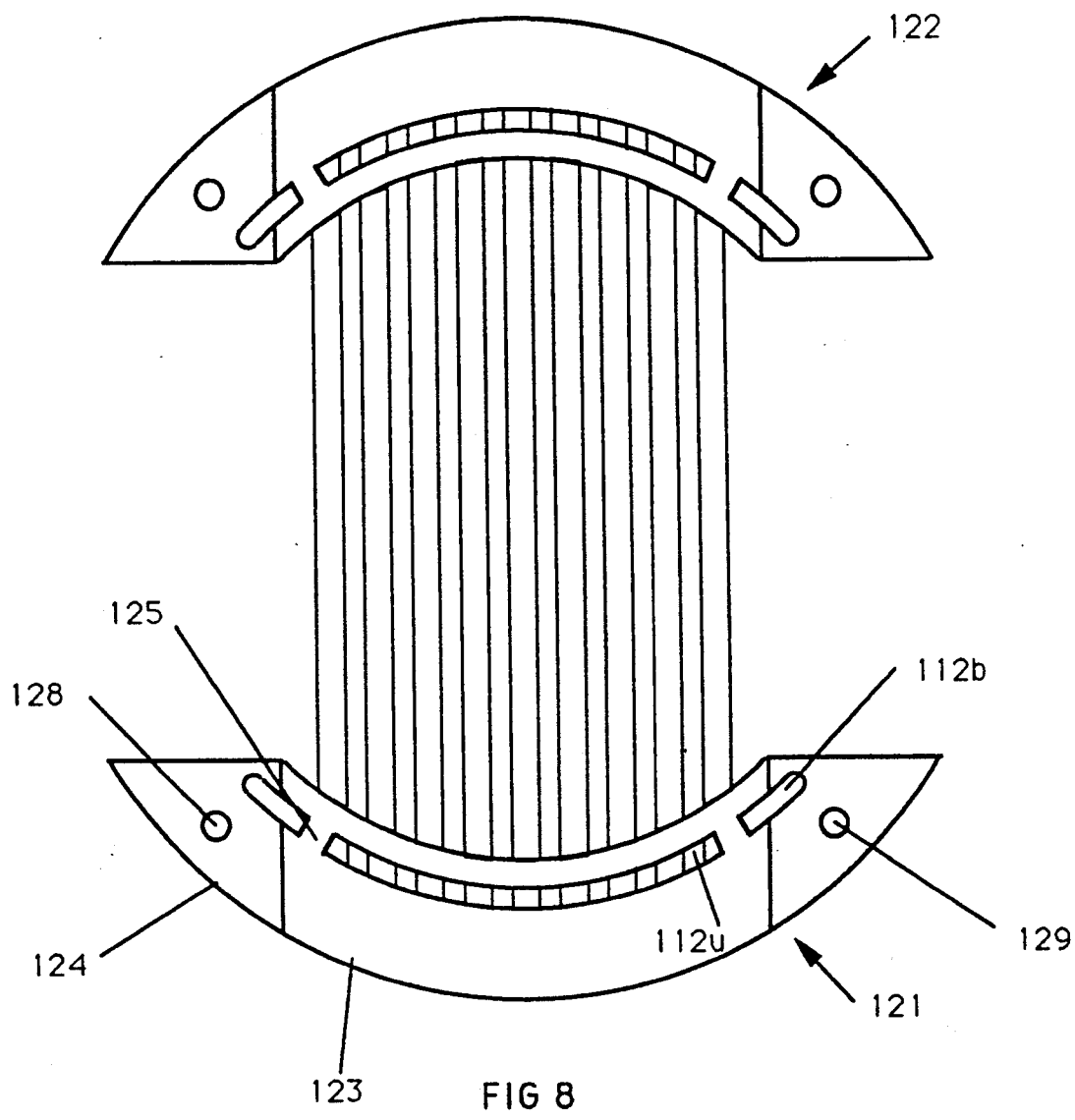
FIG. 8 is a plan view of an array having split-clip headers which are segments of a circular annular disc, one segment being a mirror-image of the other (each referred to as being a "round" split-clip header segment). Each segment is provided with an arcuate potting channel the ends of which extend beyond the outermost fibers in the array.
Figure 9:
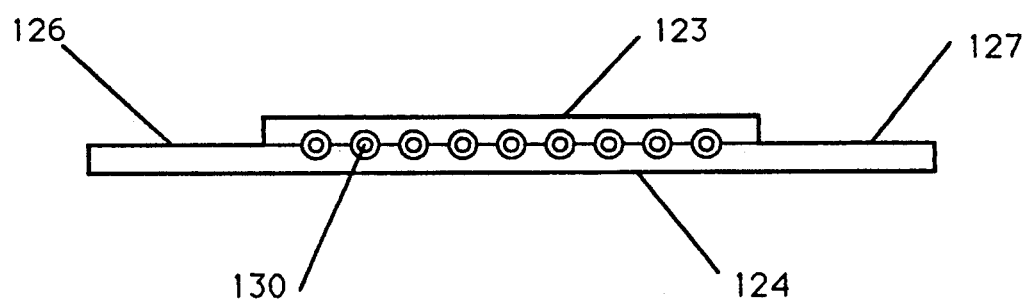
FIG. 9 is an end elevational view of the array shown in FIG. 8, showing that each split-clip header has stepped ends.

The manifest simplicity of the task of enclosing the terminal portions of the fibers in split-clip headers is best illustrated by the adhesive bonding of the sections, shown in FIG. 7. The upper and lower sections 23 and 24 precoated with adhesive 90 are located in upper 91 and lower 92 dies respectively. Fibers 30 are placed in the adhesive-coated grooves 25, and the press is closed.

The choice of adhesive depends upon the materials of the fibers and of the split-clip headers, as will readily be appreciated by one skilled in the art. Most preferred are pressure sensitive adhesives derived from monoolefinically unsaturated carboxylic acids and their esters, particularly their alkyl esters.

An alternative method of making the bond, using the press, is to provide hot air manifolds which direct hot air to the surfaces of the sections and the fibers at a sufficiently high temperature to render the surfaces of the sections as well as those of the fibers plastic enough to form a bond which is fluid-tight under the pressure it will be subjected to in the module.

EXAMPLE 1—MICROFILTRATION

Fouling and attrition of process equipment is minimized by removing silica particles having a particle diameter greater than 0.1 micron from a process stream containing silica particles most of which are about 10 $\mu$m in diameter, though some are smaller and some larger. The stream contains about 1 percent by weight of the silica particles. The stream is flowed through a module containing a stack of cartridges in which the arrays are made using Celgard X20 Microporous Hollow Fibers having an outside diameter of 460 $\mu$m, a wall thickness of about 30 μm, a surface porosity of about 40% and a pore size of about 0.03 μm.

A particular module is constructed with a stack of cartridges having an overall square cross-section defined by sides of 10 μm, in which stack a central conduit has a square cross-section, 5 cm on each side, and 15 cm long. This stack contains 200 arrays, each array containing 48 fibers spaced 1.04 mm center to center. The longitudinal spacing of the fibers in the stack is 0.75 mm, center to center. Such a stack has a surface area of 0.70 m$^2$, a packing density of 1854 m$^2$/m$^3$ and a void fraction of 0.787.

100 liters of the above-described feed is flowed through the central conduit of the module at a rate of 20 L/min. The average transmembrane pressure is about 70 kPa with an overall system pressure drop of about 3 kPa. Permeate essentially free of silica particles, is obtained at a rate of 0.60 L/min, and the concentrate, flowing a a rate of 19.4 L/min is returned to the tank. This treatment process is continued for 1 hr and 52 min until 67 L or permeate has been obtained and the feed reaches a concentration of 3% silica particles.

EXAMPLE 2—LOW PRESSURE REVERSE OSMOSIS

Distinctly colored water (referred to as "colored water") having a brownish color and an unappealing odor and taste due to the presence of soluble organic matter (e.g. humic substances) present in surface water, is clarified and upgraded in taste and odor by treating the water with low pressure reverse osmosis membrane which rejects the major fraction of the organic material. Even when the feed water has as much as 57 APHA (Pt-Co) color units and a turbidity of 0.5 NTU (turbidity units), the permeate has less than 4 APHA and a turbidity of 0.1 NTU.

The colored water is flowed through a module containing a stack in which the arrays are made using assymetric polysulfone hollow fibers fabricated by Zenon Environmental Inc. These fibers are made by the dry-wet spinning technique known in the prior art as generally described in "Polysulfone Hollow Fibers I: Spinning and Properties" by I. Cabasso, E. Klein and J, K. Smith in *Jour. Appl. Polym. Sci.* 20: 2377-2394 (1976). The fibers are 0.3 mm in inside diameter and 0.7 mm outside diameter, and have a skin with a molecular weight cut-off of 600 Daltons (mol wt units).

A module is constructed with 5 cartridges longitudinally disposed therein, each cartridge has a central conduit with a square cross-section, 5 cm on each side and 10 cm long. Each cartridge contains 120 arrays, each array having fibers spaced 1.4 mm center to center. The longitudinal spacing of the fibers in the cartridge is 0.84 mm center to center. The cartridge has a surface area of 2.3 m$^2$, a packing density of 1870 m$^2$/m$^3$ and a void fraction of 0.673.

In a pilot plant module operating at 345 kPa (50 psig) and 25° C. to process 10 L/min of colored water, up to 3 L/min of agreeably potable water is produced. The pressure drop is about 10 kPa (1.5 psi).

EXAMPLE 3—AERATION

A gas permeable membrane is used to transfer oxygen to water for the purpose of sustaining biological activity in the treatment of waste water. The principles of this process, as disclosed for example, in "Bubble-free Aeration Using Membranes: Mass Transfer Analysis" by P. L. Cote, J. L. Bersillon and A. Huyard in *Jour. Membrane Sci.* 47: 91-106 (1989), are known to effect aeration without dispersing the gas as bubbles in the liquid. Other gases may also be transferred in an analogous manner, and processes for doing so are also referred to generally as "aeration" processes.

A reactor with 50 L of water is freshly deoxygenated by the addition of 60 mg/L of Na$_2$SO$_3$ and 0.2 mg/L of CoCl$_2$. The water from the reactor is circulated in a closed loop through a module containing dense silicone rubber hollow fibers (0.305/0.635 mm, inside/outside diameters) available from Dow Corning under the tradename Silastic. Pure oxygen at a pressure of 800 kPa (relative) is fed through the permeate part of the module. Oxygen diffuses through the membrane wall and directly dissolves in the water on the opposite side of the membrane.

The module used for this application is similar to that described in Example 2 above, containing 5 stacks each 10 cm long. Each stack contains 26 fibers spaced 1.9 mm center to center. The module has a surface area of 2.0 m$^2$, a packing density of 1650 m$^2$/m$^3$ and a porosity of 0.738.

The aeration experiment is conducted by flowing the deoxygenated water through the module at a rate of 7.7 L/min and monitoring dissolved oxygen in the water. After the excess deoxygenation chemicals (Na$_2$SO$_3$ and CoCl$_2$) have been neutralized, it takes 47 sec to increase the dissolved oxygen content from 0 to 8 mg/L at 20° C.

EXAMPLE 4—PERVAPORATION

Ground water from wells contaminated with organic solvents has the solvents stripped from the water in a module constructed with the same silicone rubber hollow fibers described in foregoing example 3.

The same module is used as was used in example 3, but is operated as follows: Instead of providing oxygen under pressure through the permeate ports, a vacuum is applied through the ports to lower the pressure inside the module to less than 1 mm of mercury. A liquid nitrogen trap is provided between the permeate port and the vacuum pump to condense the vapors that selectively permeate through the membrane.

A feed of 14 L containing the contaminants listed in Table 2 is circulated in a closed loop through the module at a flow rate of 15 L/min. After 2 min of operation, the system is shut down and the total amount of condensate having a volume of 0.4 ml is collected. The condensate is analyzed and the concentrations of volatile contaminats listed in Table 2 are measured. The calculated percent removal from the feed is also shown in Table 2.

TABLE 2

| Compound | Initial conc (ppm) | Permeate conc (ppm) | Percent Removal |
|---|---|---|---|
| CHBrCl$_2$ | 0.016 | 1200 | 83.8 |
| C$_2$H$_2$Cl$_4$/C$_2$Cl$_4$ | 0.005 | 307 | 81.8 |
| m,p-xylene | 0.020 | 832 | 62.5 |
| o-xylene | 0.092 | 2971 | 53.5 |
| Toluene | 17.503 | 470119 | 46.3 |
| Chlorobenzene | 0.059 | 1245 | 39.6 |
| 1,1-dichloroethane | 0.0007 | 108 | 33.8 |
| Benzene | 0.060 | 833 | 28.0 |
| Ethylbenzene | 0.027 | 288 | 21.6 |
| Chloroform | 0.026 | 292 | 21.0 |
| Methylenechloride | 0.064 | 489 | 18.6 |
| Trichloroethane | 0.006 | n.a. | <20. |
| 1,1-dichloroethane | 0.086 | n.a. | <4. |
| 1,2-dichloroethane | 0.133 | n.a. | <4. |

TABLE 2-continued

| Compound | Initial conc (ppm) | Permeate conc (ppm) | Percent Removal |
| --- | --- | --- | --- |
| Acetone | 9.191 | 1385 | 0.3 |

It will now be evident that the apparatus and basic separation process of this invention may be used in the recovery and separation of a wide variety of commercially significant materials some of which, illustratively referred to, include (a) the recovery of water from brackish or sea water; (b) the recovery and concentration of salts, particularly those of ammonium, the alkali metal and alkaline earth metals such as the halides, sulfates, sulfites nitrates and hydroxides; and organic fluids including glycerine, lactic acid, alcohol, glycols and tanning extracts; (c) ion exchange processes; and, (d) separation of components which normally form azeotropes or have substantially the same boiling points, or ammonia from fluid organic amines; treatment of industrial waste streams such as radioactive waste, sulfite pulps, cannery waste, and the like.

In general any of the foregoing processes will benefit from a method of using the module having the structural features described hereinabove. In those processes in which one component of a feedstream is to be separated from at least one other component therein, the feedstream is flowed over the hollow fibers in a direction essentially orthogonal to the plane in which the fibers lie; that portion of the feedstream which permeates the walls of the fibers into the permeate zone is collected and conducted away from the permeate zone; and, concentrate which does not permeate the walls and remains in the feed zone is flowed away from the feed zone and out of the module.

In those processes in which first and second fluids are to be treated in the module, so that the second fluid, or a component of the second fluid is given up and added to the first fluid, the process comprises, choosing those fibers which are selectively permeable to the second fluid to be added, or to the component of the second fluid which component is to be added; flowing one of the fluids into the module, and over the fibers, essentially orthogonally to the plane in which the fibers lie under flow conditions chosen to incorporate a portion of the other of the fluids, or a component thereof; flowing said other of the fluids into the module and through the fibers under flow conditions chosen to give up a portion of the other fluid or a component thereof; collecting fluid which flows over the walls of the fibers and conducting it away, out of the module; and, collecting fluid which flows through the fibers and conducting it away out of the module.

Having thus provided a general discussion, and specific illustrations of the best mode of constructing an array of fibers held in split-clip headers having potting channels, a cartridge of post-potted arrays held together in a stack which need not be fluid-tight, and a module in which one or more cartridges may be disposed to carry out a variety of conventional separation processes, it is to be understood that no undue restrictions are to be imposed by reason thereof except as provided by the following claims.

We claim:

1. A module for use as a membrane device, comprising, a shell having two ends;
   a pair of end closures with fluid couplings removably affixed to each of said ends of said shell;
   at least one unitary cartridge disposed longitudinally within said shell, said cartridge comprising plural frameless arrays of hollow fibers of selectively permeable material held near their opposite terminal portions in a pair of mirror-image split-clip headers, each split-clip header in one array being laminated to another in a successive array so as to define a fluid-tight axial conduit having open ends through which a feedstream is flowed transversely over said fibers into a concentrate zone, the bores of said fibers being in open fluid communication with a permeate zone in said shell;
   each split-clip header having
   (i) lateral grooves which provide a through-passage in the plane of the fibers, said grooves being adapted snugly to embrace terminal end portions of each fiber so that fibers of an array lie in parallel spaced-apart relationship in a plane substantially orthogonal to the direction of flow of said feedstream, and the fibers of one array lie transversely to those of another array, and,
   (ii) a potting channel traversing at least the width of an array of fibers, the potting channel of one split-clip header in open communication with that of a contiguous split-clip header;
   an annular shell of potting resin integrally formed within said potting channels of said split-clip headers, to pot said fibers near their ends;
   means for feeding said feedstream to said shell so that said feedstream flows over said hollow fibers under a sufficient driving force to effect the separation desired and yield a permeate, and separately, a concentrate;
   means to remove said permeate from said permeate zone; and,
   means to remove said concentrate from said concentrate zone.

2. The module of claim 1 wherein,
   (i) each said split-clip header consists essentially of an upper and a lower laminar section having a width sufficient to negate damage to terminal portions of said fibers when subjected to a drag force produced by a transversely flowing feedstream;
   (ii) the number of said grooves in each split-clip header are equal to the number of said hollow fibers, each groove having an arcuate profile adapted to snugly embrace a corresponding arcuate portion of one of said hollow fibers near one of its ends;
   (iii) each of said grooves in said lower section are spaced apart with the same spacing as each groove in said upper section, so as together to embrace each one of said hollow fibers near its one end;
   (v) bonding means for bonding said sections and said terminal portions of fibers held between said sections, in near-fluid-tight relationship; and,
   (v) means for interfitting each array with another array in a generally planar configuration, said means being provided in each said split-clip header.

3. The module of claim 1 wherein said hollow fibers have an outside diameter in the range from about 100 μm to about 10 mm, and a wall thickness in the range from about 5% to 40% of said outside diameter.

4. The module of claim 1 wherein said cartridge is mounted in said shell on mounting means upon which each said array of fibers is tensionable to a preselected extent, and each array is substantially free of means other than said split-clip header to support said hollow fibers.

5. The module of claim 2 wherein said bonding means is provided by an adhesive, ultra-sound waves, a solvent weld, or dielectric heating.

6. The module of claim 2 wherein said split-clip headers have a thickness in the range from about 2 to about 5 times the outside diameter of said fibers, and said upper and lower sections are formed from flexible laminar synthetic resinous stock.

7. The module of claim 2 wherein said fibers are laterally spaced apart in grooves in each section of said split-clip header, and the grooved portion of one section is in mirror image relationship with that of the other.

8. The module of claim 2 wherein said array includes at least one tension cord having substantially the same length as said fibers to provide reinforcing for sad split-clip header and support for fibers in a next adjacent array, when said latter fibers are deflected during operation of said module.

9. The module of claim 3 wherein each array of fibers discharges said permeate into said permeate zone in opposite directions, so that the arrays in said cartridge discharge permeate into said shell in four directions, each at right angles to another.

10. The module of claim 9 wherein said hollow fibers are formed from an organic polymeric material, and each said section of said split-clip header is formed from a thermoplastic synthetic resinous material.

11. The module of claim 9 wherein said hollow fibers are formed from a ceramic/metallic material, and each said section of said split-clip header is formed from a ceramic/metallic material.

12. The module of claim 5 wherein the void fraction within said stack is in the range from about 25% to about 70%, and said fibers are held in said split-clip headers by terminal portions which range from about 4% to about 20% of the overall length of the fibers.

13. The module of claim 12 wherein at least some of said fibers in one array pressingly contact fibers from a next adjacent array, so as to provide support for each other during flow of fluid through said module.

14. The module of claim 12 wherein said fibers are essentially free from contact, one with another, in each array, and from one array to another, except during flow of fluid through said stack under flow conditions sufficient to produce a sag in said fibers.

15. A unitary cartridge of hollow fibers of selectively permeable material for use in a membrane device, comprising,
plural frameless arrays of said fibers held near their opposite terminal portions in a pair of mirror-image split-clip headers, one split-clip header in a first array being bonded to a second split-clip header in a successive array, so as to define a fluid-tight axial conduit having open ends;
said fibers having bores in open fluid communication outside said cartridge, said bores being disposed so as to duct fluid in opposite directions;
each split-clip header having
(i) lateral grooves which provide a through-passage in the plane of the fibers, said grooves being adapted snugly to embrace terminal end portions of each fiber so that fibers of an array lie in parallel spaced-apart relationship in a plane substantially orthogonal to said axial conduit, and the fibers of one array lie transversely to those of another array, and,
(ii) a potting channel in each split-clip header traversing at least the width of an array of fibers, the potting channel of one split-clip header being in open communication with that of a contiguous split-clip header; and,
(iii) an annular shell of potting resin filling said potting channels of said split-clip headers, and potting said fibers near their ends.

16. The cartridge of claim 15 wherein,
(i) each said split-clip header consists essentially of an upper and a lower laminar section having a width sufficient to negate damage to terminal portions of said fibers when subjected to a drag force produced by a transversely flowing feedstream;
(ii) the number of said grooves in each split-clip header are equal to the number of said fibers, each groove having an arcuate profile adapted to snugly embrace a corresponding arcuate portion of one of said fibers near one of its ends;
(iii) each of said grooves in said lower section are spaced apart with the same spacing as each groove in said upper section, so as together to embrace each one of said fibers near its one end;
(iv) bonding means for bonding said sections and said terminal portions of fibers held between said sections in at least near-fluid-tight relationship; and,
(v) means for interfitting each array with another array in a generally planar configuration, said means being provided in each said split-clip header.

17. The cartridge of claim 15 wherein said fibers have an outside diameter in the range from about 100 $\mu$m to about 10 mm, and a wall thickness in the range from about 5% to about 40% of said outside diameter.

18. The cartridge of claim 17 wherein said fibers are made from an organic polymeric material, a fiber having an outside diameter in the range from about 0.1 mm to 2 mm.

19. The cartridge of claim 17 wherein said fibers are made from an inorganic material, a fiber having an outside diameter in the range from about 3 mm to 13 mm.

20. A method for making a cartridge of multiple split-clip headers each holding an array of hollow fibers potted near their ends in an annular shell of potting resin, said method comprising,
(1) securing said array of fibers in each of said split-clip headers without potting said fibers, by
(i) training said plural fibers in parallel spaced apart relationship, into longitudinal, laterally spaced apart grooves provided in a first pair of opposed, longitudinally spaced apart laminar sections each having an elongated potting channel within a width corresponding to the length of one terminal portion of a fiber to be secured in one groove;
(ii) placing a second pair of laminar sections, each having longitudinal, laterally spaced apart grooves therein, and a potting channel, coextensively over said first pair so as to embrace each said terminal portion between the grooves of said laminar sections; and,
(iii) bonding said laminar sections with said fibers therebetween in at least near-fluid-tight relationship to secure said fibers in each of said split-clip headers;
(2) coaxially aligning potting channels and bonding plural split-clip headers in at least near-fluid-tight relationship;

(3) filling said potting channels with potting resin substantially without flowing resin out of said laminar sections;; and, (4) curing said resin to form said annular shell which seals said end portions and said split-clip headers in fluid-tight relationship with each other.

21. The method of claim 20 wherein each said pair of laminate sections is arcuate, said potting channels are arcuate, and said annular shell of resin is cylindrical.

22. The method of claim 20 wherein each said pair of laminate sections is an elongated rectangular strip, said potting channels are essentially linear and said annular shell of resin has a rectangular cross-section.

23. An array of hollow fibers for use in a membrane device, comprising, (i) a pair of mirror-image split-clip headers longitudinally spaced apart by the length of said fibers, each said split-clip header comprising an upper and a lower laminar section, each having a peripheral potting channel therein, and each section having a width sufficient to negate damage to terminal portions of said fibers when subjected to a drag force produced by a feedstream flowing transversely over said fibers;

(ii) plural longitudinal, laterally spaced apart grooves in each said section, the number of said grooves being equal to the number of said hollow fibers, with each groove having an arcuate profile adapted to snugly embrace a corresponding arcuate portion of one of said hollow fibers near one of its ends;

(iii) said grooves in said lower section being spaced apart with the same spacing as those in said upper section, so as together to embrace each one of said one hollow fibers near its one end;

(iv) means for bonding said sections and said terminal portions held between said sections, at least in near-fluid-tight relationship, to form said array having a pair of split-clip headers; and, (v) means for interfitting said array with another array in a generally planar configuration, said means being provided in each said split-clip header.

24. The array of claim 23 wherein said fibers have an outside diameter in the range from about 100 $\mu$m to about 10 mm, and a wall thickness in the range from about 5% to about 40% of said outside diameter.

25. The array of claim 23 wherein said fibers are free of any support means other than said split-clip headers.

26. The array of claim 23 wherein said split-clip headers fixedly confine opposed ends of at least one tension cord disposed in parallel relationship with said fibers so that said tension cord provides support for fibers in a next adjacent array.

27. The array of claim 21 wherein said fibers are made from an organic polymeric material, a fiber having an outside diameter in the range from about 0.1 mm to 2 mm, and, said upper and lower laminar sections are produced from a thermoplastic synthetic resinous material.

28. The array of claim 27 wherein said fibers are displaceable in any direction relative to the other.

29. The array of claim 21 wherein said fibers are hollow membranes made from a ceramic or metallic material material, and have an outside diameter in the range from about 3 mm to 13 mm, and, said upper and lower laminar sections are produced from a thermoplastic synthetic resinous material.

30. The array of claim 29 wherein said fibers are nondisplaceable in any direction relative to the other.

31. The array of claim 24 wherein said upper and lower laminar sections of thermoplastic synthetic resinous material are adhesively bonded to each other, and to said terminal portions of said fibers.

* * * * *